Feb. 20, 1934.  W. R. MILNER  1,948,237
WIRE WHEEL HUB COVER
Filed March 16, 1932

Inventor
Wilfred R. Milner
By Blackmore, Spencer & Flint
Attorneys

Patented Feb. 20, 1934

1,948,237

UNITED STATES PATENT OFFICE 1,948,237

WIRE WHEEL HUB COVER

Wilfred R. Milner, Pontiac, Mich., assignor to General Motors Corporation, Detroit, Mich., a corporation of Delaware Application March 16, 1932. Serial No. 599,141

1 Claim. (Cl. 41—10)

This invention relates to motor vehicles and more particularly to an accessory device for use in the ornamentation of vehicle wheels with the general purpose of enhancing the appearance of the vehicle.

An object of the invention is to provide an ornamental facing ring of simple and inexpensive design which can be easily and quickly applied over the outer exposed face of the wheel hub to produce a more pleasing effect than that presented by the conventional wheel hub.

Figure 1:
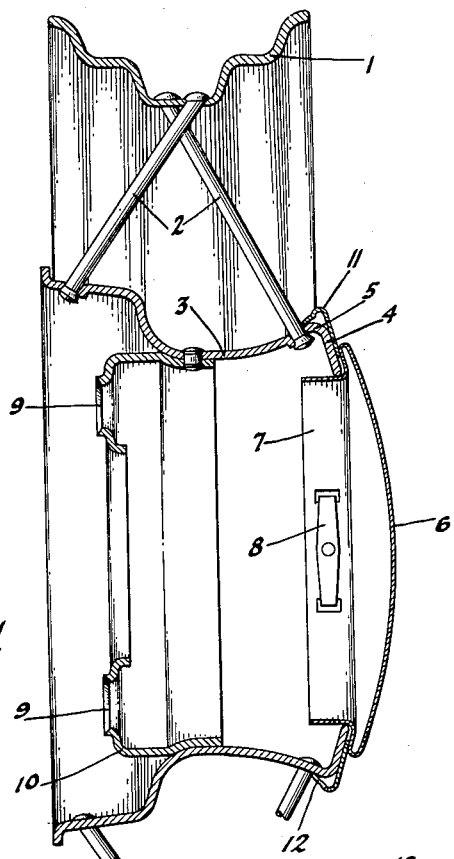
Figure 2:
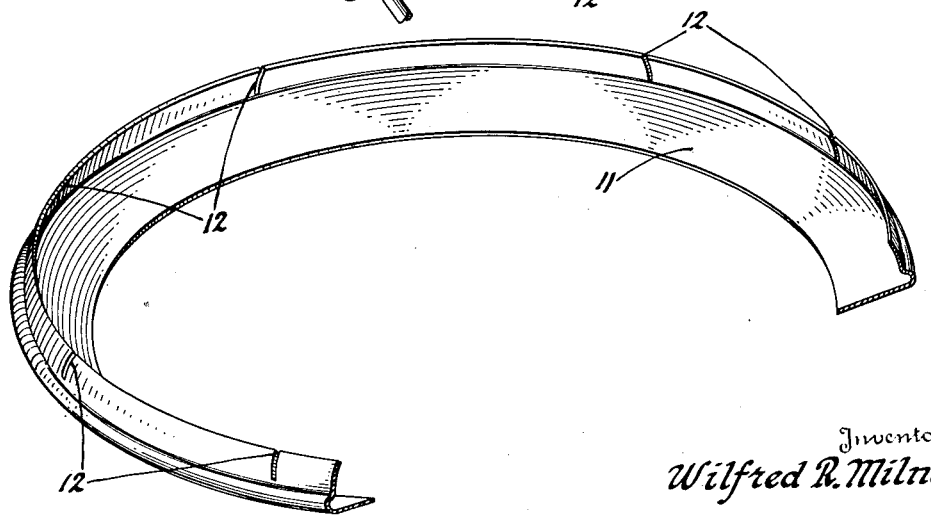

Other objects and advantages will become apparent during the course of the following detailed specification having reference to the accompanying drawing, wherein Figure 1 is a transverse sectional view of a wheel hub carrying a facing ring and Figure 2 is a detail perspective view showing a portion of the ring.

Referring to the drawing, which illustrates a preferred but not neccessarily the only embodiment of the invention, there is shown a conventional wire wheel, which includes a felloe or tire carrying rim 1, secured by a series of spokes or wires 2 to a hollow hub 3. The hub 3 is generally of cylindrical form and has at its outermost end an inturned annular flange 4 which defines an opening into the hollow body. Adjacent the angle between the hub proper and its inturned flange 4 is preferably provided an outward bulge 5. Closing the opening in the hub is a cover plate or hub cap 6, which is shown in the drawing as provided with a reversely bent rim portion overlying a portion of the flange 4, and terminating in a lateral flange 7 which carries a spring latch 8 for engagement with the inner side of the flange 4 to removably secure the cover in place. Removal of the cover plate or hub cap 6 permits access to the customary attachment nuts enclosed within the hollow hub and detachably threaded on mounting studs that project through openings 9 in the flanged ring 10 carried by and forming part of the hub body.

According to general practice, the exterior surface of the hub 3 is painted, enameled, or otherwise finished, while the cover plate 6 is usually given a brighter finish, such as chromium plate. The contrast thus afforded sometimes lacks an aesthetic appeal. To improve the effect on the observer's eye, it is here proposed to supplement the cover plate 6 by an appearance member to overlie the exposed outer face of the hub or that portion not covered by the rim of the cover plate. This appearance member may carry either the same or a contrasting finish as that on the cap. An especially pleasing effect is produced when the finish on the hub cover, facing ring and spokes corresponds.

As shown in the drawing, the appearance member may be in the nature of an annular ring 11 of substantially U-shape in cross section with one leg overlying the flange 4 and the other leg projecting laterally therefrom to provide a channel which receives the bulge or bead 5 at the apex of the angularly disclosed portions of the hub.

The laterally projecting portion of the ring is preferably provided with a series of slits 12 at spaced intervals to afford a certain amount of resiliency thereto so that the ring can be snapped into place and retained on the hub by the frictional engagement therewith of the resilient tongues formed by such slits. To further guard against accidental loss or displacement, the facing ring preferably projects beneath the cover 6 or between the rim portion of the cover and the outside face of the flange 4. The facing element may consist either of an endless ring or of a split contractible ring, and in the case of a split ring sufficient elasticity would be provided to keep it in snug engagement with the hub.

Thus there is provided an appearance member which can be manufactured and sold at low cost and readily and quickly applied to conceal or cover the ordinarily exposed portion of the hub and lend an improved decorative effect. While the invention has been described in its preferred embodiment only, it will be understood that various modifications can be made without departing from the scope of appended claim.

I claim:

For use with a vehicle wheel hub having a peripheral swell at its outer end and an inwardly extending flange which is partly overlapped by the rim of a cap detachably secured to the flange, a cover concealing the portion of the flange beyond the rim of the cap, comprising a thin sheet metal ring having an inside diameter less than the outside diameter of the cap and extending outwardly beyond the swell in the hub, a reversely bent flange at the periphery of the ring having a series of radial slits therein and being adapted to snap over the swell and engage the hub beyond the swell to position and locate the ring for its retention by the rim of the cap overlying and clamping its inner end against the hub flange.

WILFRED R. MILNER.